(12) United States Patent
Coon et al.

(10) Patent No.: US 6,900,967 B1
(45) Date of Patent: *May 31, 2005

(54) TRACE FLEXURE SUSPENSION WITH DIFFERENTIAL INSULATOR AND TRACE STRUCTURES FOR LOCALLY TAILORING IMPEDANCE

(75) Inventors: Warren Coon, Temecula, CA (US); Rafael Cuevas, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 10/199,541

(22) Filed: Jul. 19, 2002

Related U.S. Application Data (63) Continuation-in-part of application No. 09/896,500, filed on Jun. 28, 2001, now Pat. No. 6,424,500, which is a continuation of application No. 09/592,140, filed on Jun. 12, 2000, now Pat. No. 6,414,820.

(60) Provisional application No. 60/184,684, filed on Feb. 24, 2000, and provisional application No. 60/377,000, filed on Apr. 30, 2002.

(51) Int. Cl.[7] .............................................. G11B 5/48
(52) U.S. Cl. .................................................. 360/249.9
(58) Field of Search ........................... 360/245.8, 245.9

(56) References Cited

U.S. PATENT DOCUMENTS

| | | | | |
|---|---|---|---|---|
| 5,491,597 A | * | 2/1996 | Bennin et al. | 360/245.9 |
| 5,734,524 A | * | 3/1998 | Ruiz | 360/234 |
| 5,995,328 A | * | 11/1999 | Balakrishnan | 360/245.9 |
| 6,134,075 A | * | 10/2000 | Bennin et al. | 360/245.9 |
| 6,414,820 B1 | * | 7/2002 | Coon et al. | 360/245.9 |
| 6,424,500 B1 | * | 7/2002 | Coon et al. | 360/245.9 |

* cited by examiner

Primary Examiner—Brian E. Miller
(74) Attorney, Agent, or Firm—Louis J. Bachand (57) ABSTRACT

A novel flexure or interconnect for a disk drive suspension having a locally different thickness and/or width of insulative layer and a locally different thickness, width and/or relative spacing in its trace conductors to vary capacitance and circuit impedance values accordingly to locally desirable different and optimum values for the type of circuit and the suspension features.

69 Claims, 7 Drawing Sheets

TRACE FLEXURE SUSPENSION WITH DIFFERENTIAL INSULATOR AND TRACE STRUCTURES FOR LOCALLY TAILORING IMPEDANCE

CROSS-REFERENCE TO RELATED APPLICATIONS

This application is a continuation-in-part of application Ser. No. 09/896,500, filed Jun. 28, 2001, now U.S. Pat. No. 6,424,500, issued Jul. 23, 2002, which application is continuation of application Ser. No. 09/592,140, filed Jun. 12, 2000, now U.S. Pat. No. 6,414,820, issued Jul. 2, 2002, which application claims the benefit of U.S. Provisional Application Ser. No. 60/184,684, filed Feb. 24, 2000. The disclosures of each and all of these applications are incorporated herein by this reference. This application further claims the benefit of U.S. Provisional Application Ser. No. 60/377,000, filed Apr. 30, 2002.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly, to a disk drive suspension and wireless electrical interconnects and flexures for a suspension. The interconnects have multiply variable shapes, thicknesses, widths, volumes and patterns in local portions of the trace conductors and the insulative layer over their lengths and widths to vary capacitance and thus impedance values in the circuits composed of the traces. The invention localized variations in the trace and insulative layer portions of a wireless suspension interconnect enables the suspension designer to accommodate design requirements for different impedances over the length or width of the electrical interconnect and to overcome the undesirable electrical effects of unavoidable features in the suspension such as tooling holes, all to make circuit impedance values smoother and more predictable, and therefore, signals more reliable at higher data rates.

2. Description of the Related Art

Typically a wireless disk drive suspension comprises a laminate of an insulative layer such as a plastic film and a plurality of trace conductors, usually copper or copper alloy that together form an electrical interconnect. The laminate may further comprise a metal layer that supports the assembly of the trace conductors and the insulative layer. In some cases a separate metal load beam comprised of one or more parts is used to support the assembly or the assembly plus the added metal layer. The load beam, usually of stainless steel, typically has a base section that attaches to an actuator, such as an actuator arm, a spring section and a rigid section that combine to exert a force called a gram load on a read-write head within a slider carried by the rigid portion at a disk. The suspension also typically includes a flexure supported on the load beam that may comprise metal or a laminate of a support metal such as stainless steel with a plastic film. The flexure may extend substantially the full length of the load beam rigid section and support one or more circuits comprising pairs or sets of the trace conductors that connect the read or write heads of the slider to the suspension electronics, e.g. at the base of the load beam. Construction of the flexure laminate is either additive in the sense that the several layers of metal, insulative film and trace conductors are built up on one another, or subtractive in the sense that a full laminate is reduced in one or more areas to fewer than all layers.

In either case the insulative layer between the metal layer, (or between the load beam if there is no laminate metal layer), and the trace conductors has been of the same thickness under the read trace conductors as under the write trace conductors and for the longitudinal and lateral extents of these trace conductors. As set forth hereinafter there are disadvantages to the same thickness of insulative layer at the read circuit conductors as at the write circuit conductors, especially in blocking achievement of a different impedance for these circuits.

The problem of achieving different impedances for read and write circuits is addressed in my copending parent applications above. A further problem of impedance control exists, however, occasioned by the irregular nature of the suspension structures, design requirements related to geometry of the traces, and other causes that effect an unintended and undesired variation in impedance and a consequent unwanted degradation in signal integrity.

BRIEF SUMMARY OF THE INVENTION

It is an object of the invention, therefore, to provide greater control of impedance values in a disk drive suspension. It is a further object to provide a more uniform impedance through locally modifying the insulative layer-trace conductor assembly to counteract impedance changing factors, or a local differential in impedance where that is wanted in the circuits of a disk drive suspension. It is a further object to provide a variable thickness in the insulative layer, a variable thickness and width in the trace conductors, separately and combined for maximum versatility in suspension and electrical interconnect design and improved signal integrity. A further object is to provide novel forms of electrical interconnect and flexure for a disk drive suspension.

These and other objects of the invention to become apparent hereinafter are realized in an electrical interconnect for a disk drive suspension comprising an assembly of an insulative layer and trace conductors forming part of a circuit, the insulative layer comprising a plurality of local insulative layer portions, each of the trace conductors comprising a plurality of local trace conductor portions supported by the local insulative layer portions at a given relative spacing from each other, each of the local trace conductor portions having a given width and thickness, each of the insulative layer portions having a given width and thickness, the interconnect being adapted to be supported by a metal member proximately spaced from the local trace conductor portions by at least the local insulative layer portions in impedance determining relation in the circuit, one or more of the portions being varied from one or more of their given width, given thickness and given relative spacing in circuit impedance varying amount.

In a further embodiment the invention provides an electrical interconnect for a disk drive suspension comprising an assembly of an insulative layer and trace conductors forming part of a circuit, the insulative layer comprising a plurality of local insulative layer portions, each of the insulative layer portions having a given width and thickness, the Interconnect being adapted to be supported by a metal member proximately spaced from the trace portions by at least the local insulative layer portions in impedance determining relation in the circuit, one or more of the local insulative layer portions being varied from one or more of their given width and given thickness in circuit impedance varying amount.

In this and like embodiments, typically:

the insulative layer extends longitudinally and includes a series of longitudinally distributed local insulative layer portions, the portions including a longitudinally extending first local insulative layer portion between the metal member and one of the trace conductors, the first local insulative layer portion being varied in thickness relative to local insulative layer portions distally and/or proximally adjacent thereto to increase or decrease the proximity of the one trace conductor to the metal member selectively in the region of the variation in thickness in circuit impedance varying relation;

the insulative layer extends longitudinally and includes a series of longitudinally distributed local portions including a longitudinally extending first local insulative layer portion between the metal member and one of the trace conductors, the first local insulative layer portion being varied in width from narrower to broader relative to local insulative layer portions distally and/or proximally adjacent thereto to increase or decrease correspondingly the proximity of the one trace conductor to the metal member in circuit impedance varying relation;

the insulative layer extends longitudinally and includes a series of longitudinally distributed local portions including longitudinally extending first and second local insulative layer portions between the metal member and one of the trace conductors, the first and second local insulative layer portions being independently varied in thickness, width or both relative to local insulative layer portions distally and/or proximally adjacent thereto to increase or decrease correspondingly the proximity of the one trace conductor to the metal member selectively in the regions of the variations in thickness, width or both in circuit impedance varying relation;

the insulative layer extends longitudinally and laterally and includes a series of longitudinally and laterally distributed local portions including a longitudinally and laterally extending first local insulative layer portion between the metal member and one of the trace conductors, at least one of the series of local insulative layer portions being varied in thickness laterally across its width relative to local insulative layer portions laterally, distally and/or proximally adjacent thereto to vary correspondingly the proximity of the one trace conductor to the metal member selectively in the region of the variation in thickness in circuit Impedance varying relation; the series of longitudinally and laterally distributed local insulative layer portions includes at least one other local insulative layer portion that varies in thickness longitudinally relative to local insulative layer portions laterally, distally and/or proximally adjacent thereto to vary correspondingly the proximity of the one trace conductor to the metal member selectively in the region of the variation in thickness in circuit impedance varying relation; and, the one local insulative layer portion that varies in thickness laterally also varies in thickness longitudinally relative to local insulative layer portions laterally, distally and/or proximally adjacent thereto to vary correspondingly the proximity of the one trace conductor to the metal member selectively in the region of the variation in thickness in circuit impedance varying relation.

The invention further contemplates a combination of the above electrical interconnect and a metal member such as a load beam or a metal layer attached to the interconnect.

In a further embodiment, the invention provides an electrical interconnect for a disk drive suspension comprising an assembly of an insulative layer and trace conductors forming part of a circuit, each of the trace conductors comprising a plurality of longitudinally extended local trace conductor portions supported by the insulative layer at a given relative spacing from each other, each of the local trace conductor portions having a given width and thickness, and adapted to be supported by a metal member proximately spaced from the local trace conductor portions by at least the insulative layer in impedance determining relation in the circuit, one or more of the local trace conductor portions being varied from their given width, given thickness and/or given relative spacing selectively in the region of the variation in width, thickness or spacing in circuit impedance correspondingly varying amount.

In this and like embodiments, typically:

each trace conductor extends longitudinally and includes a series of longitudinally distributed local portions including a longitudinally extending first local trace conductor portion, the first local trace conductor portion being varied in thickness relative to local trace conductor portions distally, proximally or laterally adjacent thereto to increase or decrease the volume of the varied trace conductor spaced from the metal member selectively in the region of the variation in thickness in circuit impedance varying relation;

each trace conductor extends longitudinally and includes a series of longitudinally distributed local portions including a longitudinally extending first local trace conductor portion, the first local trace conductor portion being varied in width relative to local trace conductor portions distally, proximally or laterally adjacent thereto to increase or decrease the volume of the varied trace conductor spaced from the metal member selectively in the region of the variation in width in circuit impedance varying relation; and the trace conductor extends longitudinally and includes a series of longitudinally distributed local portions including longitudinally extending first and second local trace conductor portions, the first and second local trace conductor portions being independently varied in thickness, width or both relative to local trace conductor portions laterally, distally and/or proximally adjacent thereto to increase or decrease correspondingly the volume of the first and/or second local trace conductor portions spaced from the metal member selectively in the region of the variation in thickness, width or both in circuit impedance varying relation.

The invention further contemplates the above electrical interconnect and a metal member such as a load beam or a metal layer attached to the interconnect.

In a further embodiment, the invention provides a longitudinally extended flexure for a disk drive suspension comprising a metal member, the flexure comprising sets of trace conductors that each define a conductor circuit and first and second insulative layer portions attached respectively to the first and second sets of trace conductors and disposed between the set of trace conductors and the metal member, the insulative layer portions varying between themselves in thickness along the layer longitudinal and or lateral axis relative to the thickness of portions of the layer proximate thereto to vary differentially the volume of the insulative layer portions between the at least one of the sets of trace conductors and the metal member, whereby trace conductor set capacitance is varied in impedance value differentiating relation.

In this and like embodiments, typically, the trace conductors also vary in thickness and/or width along their longitudinal axis in conductor circuit impedance varying relation, and the suspension includes a load beam, the load beam defining the suspension metal member, or the metal member is attached to the insulative layer.

In a further embodiment, the invention provides a longitudinally extended flexure for a disk drive suspension comprising a metal member, the flexure comprising first and second sets of trace conductors that each define a conductor circuit and first and second insulative plastic layers attached respectively to the first and second sets of trace conductors and disposed between the set of trace conductors and the metal member, the first plastic layer locally varying in thickness along its longitudinal axis to vary correspondingly the volume of the first plastic layer between the first set of trace conductors and the metal member, whereby trace conductor first set capacitance is varied in conductor circuit impedance varying relation.

In this and like embodiments, typically, one or more of the trace conductors vary in thickness along their longitudinal axis in conductor circuit impedance varying relation, the second plastic layer also varies in thickness along its longitudinal axis in trace conductor second set capacitance varying relation, the first plastic layer also varies in thickness in a direction transverse to its the longitudinal axis.

In a still further embodiment, the invention provides a longitudinally extended flexure for a disk drive suspension comprising a metal member, the flexure comprising first and second sets of trace conductors that each define a conductor circuit, a metal layer, and first and second insulative plastic layers between the first and second sets of trace conductors and the metal layer, the first plastic layer locally varying in thickness along its longitudinal axis to vary correspondingly the volume of the first plastic layer between the first set of trace conductors and the metal member, whereby trace conductor first set capacitance is varied relative to the second set of trace conductors and in first set trace conductor circuit impedance varying relation. The flexure can be combined with a disk drive suspension metal member, such as a load beam, or a metal layer is attached to the insulative plastic layer.

In yet another embodiment herein, there is provided a longitudinally extended flexure for a disk drive suspension comprising a metal member, the flexure comprising first and second sets of trace conductors that each define a conductor circuit and first and second insulative plastic layers attached respectively to the first and second sets of trace conductors and disposed between the set of trace conductors and the metal member, the first and second plastic layers independently locally varying in thickness along their respective longitudinal axes to vary correspondingly the volume of the first and second plastic layers respectively between the first set of trace conductors and the metal member, whereby the capacitance of the trace conductor first and second sets is independently locally varied in conductor circuit impedance varying relation.

In this and like embodiments, typically, the flexure is combined with a disk drive suspension metal member, such as a load beam or the metal member comprises a metal layer attached to the plastic layer.

In a further embodiment, there is provided a longitudinally extended electrical interconnect for a disk drive suspension, the Interconnect comprising first and second sets of trace conductors that each define a conductor circuit and first and second insulative plastic layers attached respectively to the first and second sets of trace conductors to be disposed between the sets of trace conductors and a metal member, the first plastic layer varying in thickness along its longitudinal axis relative to the thickness of the second plastic layer to vary differentially the volume of the first plastic layer to be between the first set of trace conductors and the metal member relative to the volume of the second plastic layer to be between the second set of trace conductors and the metal member, whereby trace conductor first and second trace conductor set capacitance is varied in impedance differentiating relation.

In this and like embodiments, typically, at least one of the interconnect trace conductors varies in thickness along its longitudinal axis in conductor circuit impedance varying relation, each first and/or second plastic layer varies locally in thickness along its respective longitudinal axis in trace conductor first and second set respective capacitance varying relation, the first plastic layer also varies in thickness in a direction transverse to its the longitudinal axis, and the first and second plastic layers vary in thickness in a direction transverse to their the longitudinal axes.

An invention further embodiment includes a longitudinally extended electrical interconnect for a disk drive suspension comprising a metal member, first and second sets of trace conductors that each define a conductor circuit, and first and second insulative plastic layers between the metal layer and the first and second sets of trace conductors, the first plastic layer locally varying in thickness along its longitudinal axis to vary correspondingly the volume of the first plastic layer between the first set of trace conductors and the metal layer, whereby trace conductor first set capacitance is varied relative to the second set of trace conductors and in first set trace conductor circuit impedance varying relation.

In this and like embodiments, typically, at least one of the trace conductors varies in thickness along its longitudinal axis in conductor circuit impedance varying relation, both the first and second plastic layers vary in thickness along their respective longitudinal axes in trace conductor first set and second set capacitance varying relation, the first and/or second plastic layers vary in thickness along their respective longitudinal axes and vary in thickness transversely to the longitudinal axes in conductor circuit first and/or second set capacitance varying relation, and the interconnect is combined with a disk drive suspension metal member.

A further invention embodiment includes a longitudinally extended flexure for a disk drive suspension comprising a metal member, the flexure having longitudinally varying impedance values in conductor circuits, the flexure comprising first and second sets of trace conductors that each define a conductor circuit and first and second insulative plastic layers attached respectively to the first and second sets of trace conductors and disposed between the set of trace conductors and the metal member, the first plastic layer having locally a thickness along its longitudinal axis different from the thickness of the second plastic layer to vary differentially the volume of the first plastic layer between the first set of trace conductors and the metal member and the volume of the second plastic layer between the second set of trace conductors and the metal member, whereby trace conductor first set capacitance is varied relative to trace conductor second set capacitance in impedance differentiating relation between the first and second trace conductor sets, the suspension typically including a load beam, the load beam defining the suspension metal layer, and the flexure comprises the trace conductors, the insulative plastic layers and a metal layer, the metal layer defining the suspension metal member.

In a further embodiment, the invention provides a longitudinally extended flexure for a disk drive suspension, the flexure having longitudinally varying impedance values in conductor circuits, the flexure comprising first and second sets of trace conductors that each define a conductor circuit and first and second insulative plastic layers attached respectively to the first and second sets of trace conductors to be disposed between the set of trace conductors and a metal member, the first and/or second plastic layers locally varying in thickness along their respective longitudinal axes to have a differential thickness ranging from a locally lesser thickness in a first plastic layer to a locally greater thickness in a second plastic layer, the first set of trace conductors having the plastic layer of the locally lesser thickness and defining a read circuit and having a the plastic layer providing a spacing to be relatively closer to the metal member across the plastic layer and the other of the sets of trace conductors having a the plastic layer of locally greater thickness defining a write circuit and providing a spacing to be relatively farther from the metal member across the plastic layer, whereby there is a capacitance differential between the read and write circuits, the capacitance differential providing the selected and different impedances for the circuits.

In this and like embodiments, typically, the selected impedance for the write circuit is greater than the selected impedance for the read circuit, the selected write circuit impedance ranges from 80 to 110 ohms, the read circuit impedance ranges from 60 to 80 ohms, and the first plastic layer lesser thickness is not less than 0.00030 inch, and the second plastic layer greater thickness is not less than 0.00050 inch, the first and second plastic layers differing in thickness by at least 0.00020 inch.

The invention thus provides a disk drive suspension having selected and different impedance values for its read trace conductor circuit and its write trace conductor circuit, the suspension comprising a steel load beam having a rigid section and extended along the length of the load beam rigid section a flexure for supporting a slider at the distal end of the load beam for operative association with a disk, the flexure comprising an assembly with the load beam of plural sets of trace conductors and an insulative plastic layer that spaces the trace conductors from the load beam in capacitance determining relation, the plastic layer having along the load beam longitudinal axis locally a differential thickness ranging from a lesser thickness in a first longitudinal portion to a greater thickness in a second longitudinal portion, the plural sets of trace conductors including a first set of trace conductors defining a read circuit and attached to the plastic layer at a spacing to be locally relatively closer to the load beam across the plastic layer and a second set of trace conductors defining a write circuit and attached to the plastic layer at a spacing to be locally relatively farther from the load beam across the plastic layer, whereby there is a capacitance differential between the read and write circuits, the capacitance differential providing the selected and different impedances for the circuits.

In this and like embodiments, typically, the first and/or second set plastic layers define a differential thickness in first and second lateral portions, the flexure further comprises a metal layer bonded to the plastic layer, the plastic layer comprises polyimide resin, the stiffness of the disk drive suspension is reduced less than about 10% as a result of the difference in thickness between the plastic layer first and second lateral portions, the plastic layer first lateral portion has a thickness of not less than 0.00030 inch, and the plastic layer second lateral portion has a thickness of not less than 0.00050 inch, the plastic layer first and second lateral portions differing in thickness by at least 0.00020 inch.

The invention further provides an flexure and/or interconnect for a disk drive suspension in which the interconnect has on or in or both on and in its surface where electrostatic charge is likely to build up a charge dissipative agent comprising a metal oxide, a metal or an organic composition in an electrostatic charge dissipating amount.

In its method aspects the invention provides a method of making a disk drive suspension comprising a metal such as a steel member and a flexure having selected and different impedance values for its read trace conductor circuit and its write trace conductor circuit, the circuits comprising trace conductors attached to a plastic layer disposed between the trace conductors and the metal member, the method including maintaining a thickness differential between longitudinally successive portions of the plastic layer in one or both of the circuits in capacitance controlling relation, whereby there is a capacitance differential along the length of the read and/or write circuits, the capacitance differential providing selected and different impedances for the circuits.

The method further contemplates maintaining a thickness differential between laterally adjacent portions of the plastic layer in one or both of the circuits in capacitance controlling relation, whereby there is a capacitance difference along the width of the read and/or write circuits, the capacitance difference providing selected and different impedances for the circuits, maintaining a thickness differential between longitudinally successive portions of the trace conductors in one or both of the circuits in capacitance controlling relation, whereby there is a capacitance difference along the length of the read and/or write circuits, the capacitance difference providing selected and different impedances for the circuits, and, maintaining a thickness differential between longitudinally successive portions of the trace conductors in one or both of the circuits in capacitance controlling relation, whereby there is a capacitance difference along the length of the read and/or write circuits, the capacitance difference providing selected and different impedances for the circuits. In a further aspect, the invention method includes controlling impedances in a disk drive suspension comprising a metal member and an electrical interconnect supported by the metal member and comprising first and second circuits having trace conductors attached to a plastic layer disposed between the trace conductors and the metal member, the method including locally varying one or more of the longitudinal thickness of the plastic layers, the lateral thickness of the plastic layers, and the longitudinal thickness of the trace conductors in the first and/or second circuits to correspondingly control capacitance in the trace conductors and impedance in the circuits. In this embodiment, typically there is further included providing the disk drive suspension with a load beam, the load beam defining the metal member, and providing a metal layer on the electrical interconnect opposed to the load beam, the metal layer defining the metal member.

In a further method aspect, the invention provides a method of tailoring impedance differentially throughout an electrical interconnect adapted to be used in a disk drive suspension having a metal layer, the method including providing the electrical interconnect with an insulative layer having multiple portions and relatively spaced trace conductors each having multiple portions and forming part of a circuit, and locally varying one or more of the thickness and width of the insulative layer portions and the thickness, width and/or relative spacing of the trace conductors at longitudinally adjacent and/or laterally adjacent portions thereof to correspondingly vary capacitance in the trace conductor portions in circuit impedance varying relation selectively at the local variations.

BRIEF DESCRIPTION OF THE SEVERAL VIEWS OF THE DRAWINGS

The invention will be further described in conjunction with the attached drawings in which.

DETAILED DESCRIPTION

As noted briefly above, trace flexures or wireless flexures have been built with either a subtractive process or an additive process that provides a planar device in which the stainless steel layer or load beam (if used), the insulative layer, usually a dielectric polyimide film layer, and the trace conductors, usually conductive copper layers are all essentially uniform thickness throughout their extents. The polyimide layer is the same thickness everywhere on a single part within manufacturing tolerances, and there has been no profiling in the insulative layer thickness by design. This is also true of the other, e.g. the conductor layers.

The electrical properties of the wireless flexure are a function of the thickness of the layers, the dielectric and physical material properties of each material, and the geometry, or mechanical layout, of each layer.

In calculating the capacitance C of a wireless flexure, one takes into consideration the spacing between the conductive traces, the width of the traces, the thickness of the copper traces and the polyimide film, the conductivity of the stainless steel and the copper, and the dielectric properties of the polyimide. This provides the capacitance per unit length. All of these parameters are chosen and therefore known In a given device.

In designing a flexure for a suspension device, after the initial choice of thickness of each material is made, the thickness of each layer is normally held constant. For a subtractive process part, this is a matter of convenience and cost. The copper layer may be thickness-controlled by etching down the thickness starting at the original layer thickness. The dielectric film layer between the copper and the stainless steel cannot be easily accessed to etch under the copper. The stainless steel layer could be etched but this variation will not have much effect on the device electrical performance.

In the additive process, the layers can be built up to any desired thickness up to a certain point, which is approximately 10 microns for copper, and 25 microns for a dielectric film such as a polyimide film. The steel layer of the flexure is the starting point; it can be chosen initially and reduced from that starting value.

As frequencies approach 500 MHz and above, capacitance (C) and impedance (Z) become increasingly important to the wireless flexure design. The capacitance represents the amount of electrical signal that must be used to charge the device before each pulse is transmitted. Impedance represents the load that the electrical signal does work on. Capacitance affects the signal response as a function of time ("time domain") and impedance affects the signal response as a function of frequency ("frequency domain").

A trace circuit design can be thought of as two separate designs, one for the read circuit and one for the write circuit. The read circuit connects the read elements of the recording head to the actuator circuitry. The write circuit connects the write elements to the actuator circuitry. Present design trends typically design the write traces to be as close as possible to 110 ohms impedance, and the read traces to be as close as possible to 60 ohms impedance. In some cases, the target may be 100 ohms for read traces and 80 ohms for write traces.

Assuming no losses, the Z (impedance) equals SQR(L/C), or SQuare Root of inductance divided by capacitance. Inductance is basically fixed by the length of the trace, and so cannot be easily controlled. Therefore, in this invention control of Z is through controlling C in a novel manner. The capacitance is separately specified for a given design with a maximum value, typically 2 pF or 3 pF per trace.

Controlling (increasing) C is commonly done by increasing the trace width beyond the normal (small) value of 0.0016 inches or by reducing the separation between traces below the usual value, also 0.0016 inches. Increasing the width increases the capacitance to ground directly in proportion to width. Decreasing the spacing to the adjacent trace increases the capacitance trace to trace.

Controlling (decreasing) C is usually done by increasing the trace-to-trace spacing or by removing the stainless layer under portions of the traces.

In the invention the suspension and method can control the relationship between L and C to a specified value that is different for the read and write sides of the same part, and hold C to be less than a maximum value.

In a mechanically and electrically critical part such as a disk drive suspension flexure it is difficult to achieve the desired Z and C control simultaneously and also meet the mechanical requirements for stiffness and frequency response in the space allocated. Using prior art techniques, such as the removal of the stainless steel layer under the traces, makes the part be asymmetrical when the Z is adjusted by controlling the C. For example, the read side (60 Ohms) would require larger capacitance than the write side (110 ohms), so the traces would have to be wider than the other (write) side and the flexure would be asymmetrical mechanically, or the stainless would have to be removed from the write side, again leading to asymmetrical mechanics. The asymmetry of the mechanics is because the moduli of elasticity of stainless and copper are very high relative to polyimide.

It is difficult or impossible to meet all of the conflicting requirements simultaneously with prior art techniques with even the presently most advanced circuit designs having performance characteristics far different from the optimum. Thus, by using such design techniques, a wireless flexure and a suspension assembly thereof can be constructed that meets the specification for read and write impedance and stiffness but not at the same time capacitance or resistance.

This problem is solved in the above-noted parent applications by grading or tapering the dielectric polyimide film or layer thickness selectively to achieve the desired capacitance, e.g. as part of the original film material, or by etching or otherwise removing part of an original insulative layer. Most of the capacitance from trace to trace is controlled by the trace to stainless steel layer capacitance, and this capacitance is controlled by the thickness of the polyimide. The polyimide contributes only a negligible amount to the stiffness, so varying the thickness of the polyimide does not change the stiffness much and the change is controllable. Thus, for a doubling of the film thickness the pitch or roll stiffness is increased less than 10 per cent. If the polyimide film layer thickness is reduced to half, the pitch or roll stiffness is also reduced by less than 10 per cent. There is accordingly considerable freedom in changing the film thickness without undue effects on mechanical properties. The capacitance per unit length in an area can be doubled (or halved) with only a minor change in stiffness. This fact suggests a solution to the dilemma involved in trying to design for both stiffness and impedance and underlies the present invention.

In a typical design situation, the existing design of a conventional suspension flexure that had relied on a series of holes to control capacitance and thus impedance but had the correct impedance only on the write side, is modified to eliminate the holes and correct the impedance is for the read side without changing the already correct impedance on the write side. To do this, the polyimide thickness at the left and right lateral portions of the load beam rigid section is altered differentially. For example, assuming the film thickness was a uniform 0.00071-inch in a given design, providing a correct capacitance/impedance for the write side but too low a capacitance and too high an impedance for the read side, a new capacitance must be realized on the read side. To do so, calculate the new capacitance value as follows:

$Z=SQR\ (L/C)$ $Z^\wedge=L/C$ $C=L/Z^\wedge 2$ $C_1/C_2=Z_2^\wedge 2/Z_1^\wedge 2$ for $Z_1=100$
and $Z_2=80$ for the assumed case $C_1/C_2=10000/6400$ $C_1/C_2=1.56$ This means there is a need to make a 1.56 increase in capacitance of the read traces to reduce the read impedance to the desired value of 80 ohms. This can be achieved by reducing the thickness of the polyimide from 0.00071 inches to 0.00045.

The calculation of the desired thickness is simply

| | |
|---|---|
| $C = kA/d$ | A is area of capacitor, d is spacing between plates, k is a constant |
| $C_1/C_2 = d2/d1$ | |
| $d_2 = d_1\ C_1/C_2$ | |
| $d_2 = .00071\ \text{inches}/1.56$ | |
| $d_2 = .00045\ \text{inches}$ | |

The result means that to achieve the correct impedance for the read side there needs to be a reduction in the polyimide thickness to 0.00045 inches, a reduction that will have no significant effect on the stiffness, or stiffness symmetry.

Figure 19:
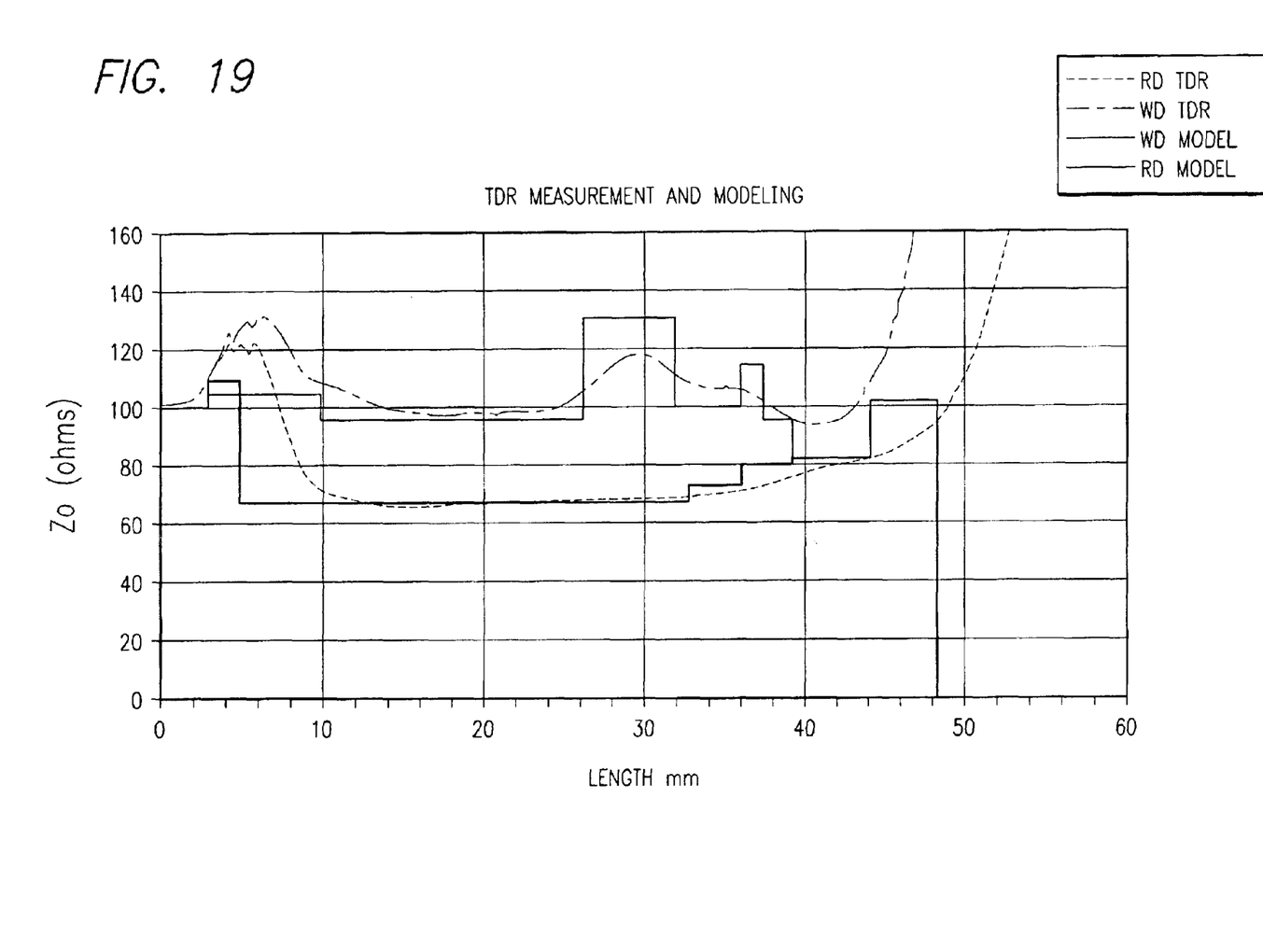
FIG. 19 is a graphical depiction of impedance variations, including spikes attributable to features in the metal layer of the load beam, in read and write circuits over the length of an interconnect, and the smoothing of these variations, particularly the spikes through localized modification of the insulative layer and the trace conductors locally at the spike regions.

In general, it is desirable to have a constant impedance along the length of the part, and to have that impedance match the impedance of the read or write circuitry, and to avoid sharp changes in impedance. In typical suspension parts, however, the impedance varies along the length of each path of each trace conductor. This cannot be avoided in a conventional suspension since the need to achieve acceptable mechanical performance in stiffness, the need for tooling holes, and symmetry considerations dictate certain shapes and paths that may not be ideal from an impedance standpoint. In this invention, the peculiar limitations of a given suspension part are considered, their expected impact on impedance values assessed, and localized adjustments made to one or more portions of the trace conductors and portions of the insulative layer. The local adjustments counteract the undesired, particularly the local undesired effects on impedance values in the design under consideration by varying thickness, widths and thicknesses and widths of the insulative layer portions and the trace conductors in various combinations as needed. By taking advantage of the possibility of changing the trace conductor thickness and/or the insulative layer thickness at highly localized regions along the conductor paths the design-imposed changes in impedance are minimized. See FIG. 19 where an assumed profile of an interconnect I is modeled to show the effects in the time domain of variations in the impedance $Z_0$ profile for the read circuit RD and the write circuit WD over the suspension interconnect length. The RD and WD curves closely follow the profile, indicating that variations in the suspension interconnect profile will affect the impedance and control of the profile is the means of controlling impedance.

Further, different changes are made for the read pair and the write pair of trace conductors to make the desired impedance match with the rest of the circuitry. That is the write pair impedance matches the write source impedance and load impedance, and the read pair impedance matches the read source impedance and load impedance.

As noted above, a typical present requirement is for the write impedance to be 70 ohms and the read impedance to be 40 ohms. The write circuit traces, however, will not stay at 70 ohms over the length of the traces as the pair winds its way around the obstacles that are found on the load beam, makes its necessary turns and passes over open spaces then vertically over conductive metal surfaces, such as the load beam, and at different spacings therefrom, and then at a lateral spacing from the metal surfaces as the flexible conductor is carried to the proximally located contact pads. Whenever the impedance changes from the target value of 70 ohms to some other values as a result of the environment just noted, some signal is reflected. A reflected signal does not just disappear, it adds to the noise on the circuit and so reduces the information transmitted, just as an echo in a room reduces one's ability to understand what is being said.

In suspension design therefore account must be taken of impedance variation issues as one moves to higher frequencies for the transmission of data, seeking ever higher data rates for the disk drive.

Figure 1:
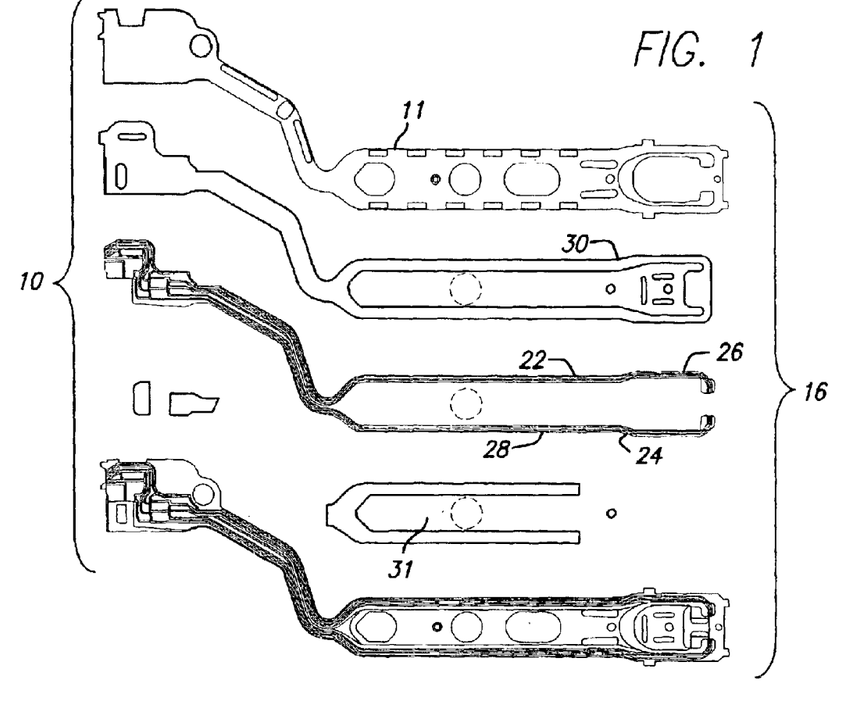
FIG. 1 is an exploded view of the invention flexure.
Figure 2:
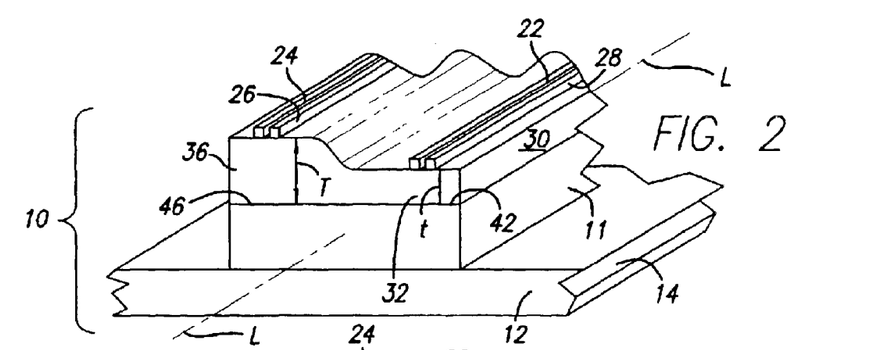
FIG. 2 is an isometric view of the flexure attached to a suspension load beam rigid section.
Figure 3:
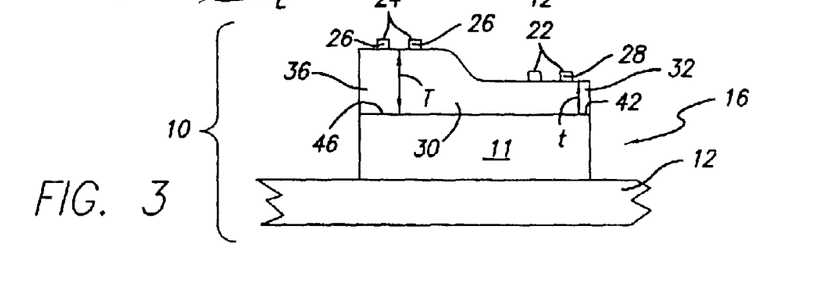
FIG. 3 is a view in vertical section of the assembled flexure and suspension load beam rigid section.
Figure 4A:
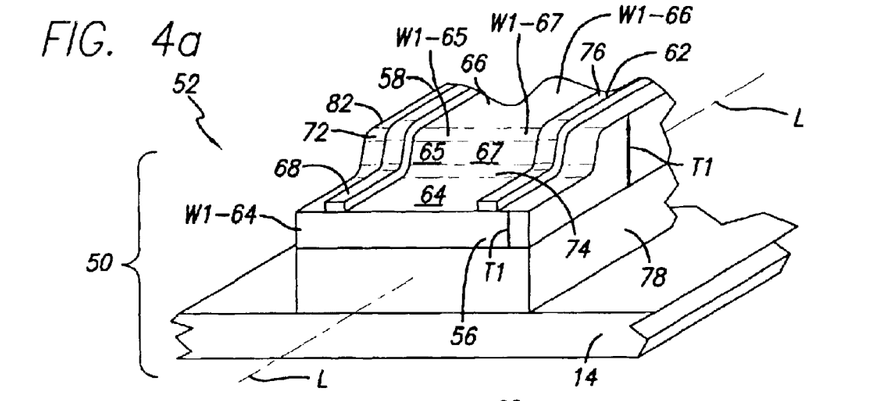
FIG. 4 is an oblique view of an embodiment of the invention having longitudinal thickness variation in the insulative layer portions.
Figure 4B:
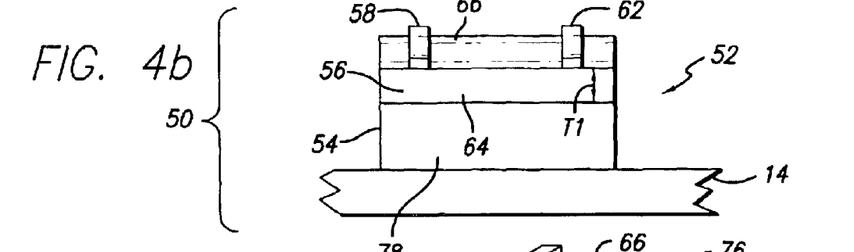
Figure 5A:
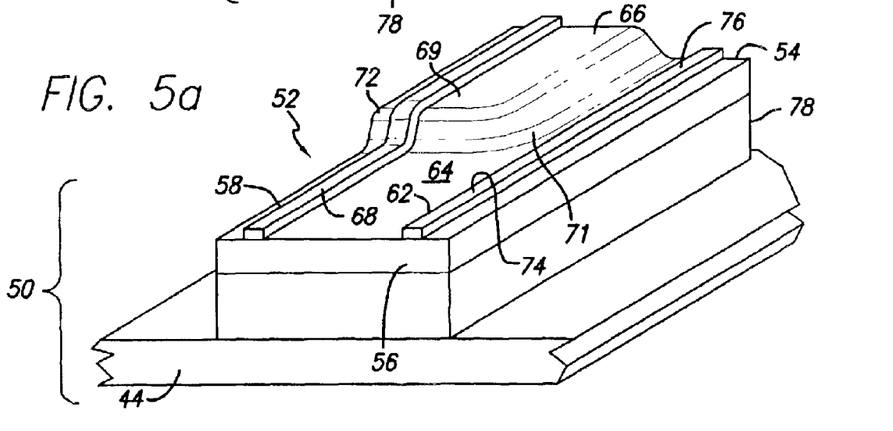
FIG. 5 is an oblique view of a further embodiment of having longitudinal and transverse thickness variation in insulative layer portions.
Figure 5B:
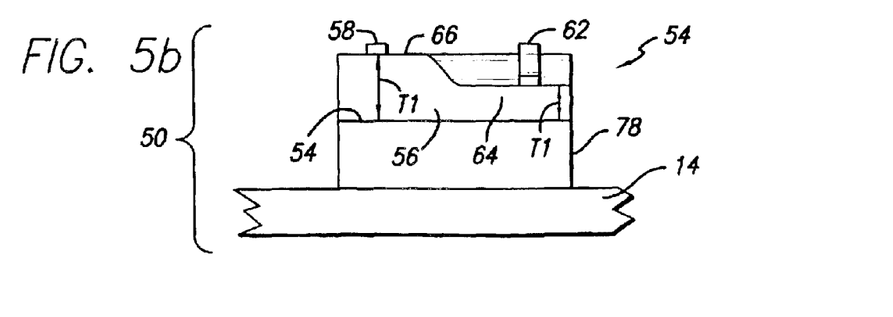

With reference now to the drawings in detail, in FIGS. 1, 2 and 3, the suspension is shown at 10 and comprises in part flexure 16 having a steel underlayer 11 that will be attached (FIGS. 2 and 3) to a stainless steel load beam 12. Load beam 12 has a predetermined shape that is not critical here and that is dictated by desired mechanical properties and mass considerations. Load beam 12 has a rigid section 14. Flexure 16 in assembled condition with the load beam 12 extends along the length of at least the load beam rigid section 14 and supports a slider (not shown) at the distal end of the load beam for operative association with a disk (not shown).

The flexure 16 comprises an assembly of the stainless steel underlayer 11, copper trace conductors 26 defining read conductor circuit 22 and read copper trace conductors 28 defining read conductor circuit 24. Flexure 16 further comprises, disposed between the steel underlayer 11 and the trace conductors 26, 28 an insulative layer, such as plastic insulative laminated or deposited film or layer 30, typically polyimide film, that spaces the trace conductors from the metal member e.g. the load beam steel underlayer 11 (and/or from the load beam 12 when underlayer 11 is not present) a distance that impacts the trace conductor capacitances. An optional second plastic film 31 covers the exposed trace conductors 26, 28 above the layer 30. See FIGS. 2 and 3.

In order to provide the locally differentiated capacitance that is a feature of the invention, and that enables the locally varied, controlled impedance between the read and writes sides of the suspension and between different portions of the read and/or write sides along their lengths and widths, the dielectric film 30 has, in one embodiment, in a direction lying transverse to the longitudinal axis L—L of the load beam a differential thickness. This thickness ranges from a lesser thickness t in a first lateral portion 32 of the film 30 adjacent one edge margin 42 of the stainless steel layer 11 to a greater thickness T in a second lateral portion 36 adjacent the other edge margin 46 of the stainless steel layer 11.

Read conductor circuit 22 comprises plural trace conductors 26 and defines a read circuit that is attached to the layer 30 first lateral portion 32 at a spacing equal to thickness t to be relatively closer to the stainless steel layer 11, and load beam 12, across that insulative layer portion. Write conductor circuit 24 comprises plural trace conductors 28 and defines a write circuit that is attached to the insulative layer second lateral portion 36 at a spacing equal to thickness T to be relatively farther from the steel layer 11 and load beam 12, across that film portion. As noted above, the differential spacing provides a capacitance differential respectively between the steel layer 11 and the read and write circuits 22 and 24. The capacitance differential provides the desired selected and different impedances for the circuits.

With reference now to FIGS. 4A, 4B, 5A, 5B, and 6, a further embodiment is shown in which suspension 50 comprises in part an electrical interconnect 52 comprising an assembly 54 of an insulative layer 56 and pairs of trace conductors 58, 62 forming part of a circuit 60. Insulative layer 56 comprises a plurality of local insulative layer portions 64, 66 (indicated by dashed lines for purposes of illustration, but there is no separation between them as the insulative layer is generally a continuous web). Each of the trace conductors 58, 62 also comprise a plurality of local trace conductor portions 68, 72, 74, 76 (indicated by dashed lines for purposes of illustration, but there is no separation between them as each trace conductor is a continuous metal strip). Trace conductors 58, 62 are supported by the local insulative layer portions, e.g. 64, 66 at a given relative spacing from each other as shown. Each of the local trace conductor portions 68–76 have a given width WC and thickness TC. Each of the insulative layer portions 64, 66 have a given width WI and thickness TI.

Interconnect 52 is adapted to be supported by a metal member 78 that can be a load beam separate from the interconnect, or a metal layer laminated to the interconnect. The metal member 78 is proximately spaced from the local trace conductor portions 68–76 by at least the thickness TI of the local insulative layer portions 64, 66, or more where there is an air or other separation beyond the thickness of the insulative layer 56. The spacing by the insulative layer 56 of the trace conductors 58, 62 from the metal member 78 and the relative thickness, width and spacing of the trace conductors from each other determines capacitance and the impedance value at a given locus in the circuit attributable to metal member-to-trace conductor spacing considerations. The interconnect 52 (and the flexure 16 in that case) can be surface or subsurface-treated with a charge dissipative agent wherever an ESD (Electrostatic Discharge) potential is known or anticipated to occur. See FIGS. 7b and 10a below. Suitable charge dissipative agents can comprise a metal oxide, that can be coated on or incorporated into the interconnect surface, the metal oxide comprising preferably chromium oxide, tin oxide, nickel oxide, lead oxide and/or copper oxide. Alternatively the dissipative agent comprises a metal in an electrostatic potential dissipating amount at the interconnect surface, particularly one or more of aluminum, gold, chromium and tin that be coated on or incorporated into the interconnect surface, as by being coated, vapor deposited or sputter-deposited, as is deemed effective. Carbon, particularly in the form of carbon fibers or a colloidal suspension of graphite, is useful as the charge dissipative agent 54 on or in the interconnect or flexure surface. The dissipative agent can also comprise an organic composition, such as a surfactant or conductive synthetic organic polymer.

In accordance with the invention, one or more of the insulative layer portions e.g. portions 64, 66 and/or one or more of the trace conductor portions e.g. portions 68–76 are varied independently and locally from one or more of their given width WI, WC, given thickness TI and TC and given relative spacing in circuit impedance varying amount at the locus of interest and the impedance thereby adjusted accordingly with a view to minimizing changes in impedance from the target value at that locus, and generally, so that the impedance fluctuations along the length of the conductors 68, 72 are reduced and the overall impedance profile kept near the desired level.

In one embodiment, the insulative layer 56 thickness is varied. That is, one or more of the local insulative layer portions 64, 66 are varied from one or more of their given width WI and given thickness TI in circuit impedance varying amount. Thus, typically, the insulative layer 56 extends longitudinally and includes a series of longitudinally distributed local insulative layer portions 64, 66. Portions 64, 66 include longitudinally extending first local insulative layer portion 64 between the metal member 78 and one of the trace conductors, e.g. 68. First local insulative layer portion 64 varies in thickness to have a decreased thickness WI-64 from the original thickness WI (could be an increased thickness WI-64 in another embodiment) relative to the thicknesses WI-65 and WI-67 of local insulative layer portions, 65, 67 laterally, distally and/or proximally adjacent thereto. The different thicknesses, WI-64 vs. WI, serve to decrease (or in another embodiment increase) the proximity of trace conductor portions 68, 70 of trace conductor 58 to the metal member 78 selectively in the region 82 of the variation in insulative layer 56 thickness so as to vary the trace conductor 58 circuit impedance as a function of the portion 64 thickness change.

Figure 6:
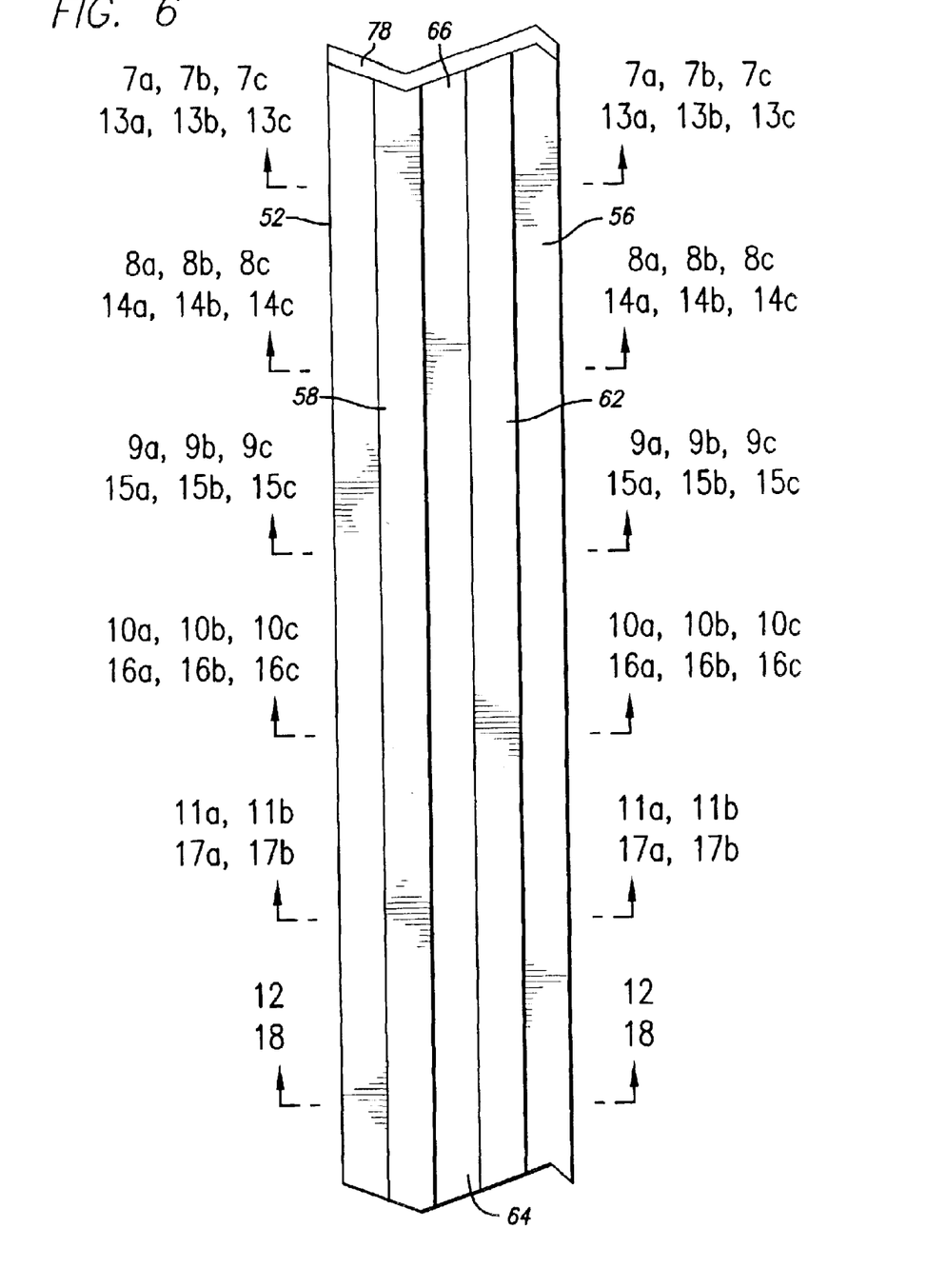
FIG. 6 is a fragmentary plan view of an electrical interconnect according to the invention.

The variety of configurations available under the invention are illustrated in part in FIGS. 6 and 7a–18, wherein like parts have like numbers to those used above. FIG. 6 is a composite, fragmentary view of the interconnect 52 (or flexure 16) that has different section lines that are used to illustrate possible configurations at that location on the interconnect 10. Not all the configurations are simultaneously desirable or even possible in the sequence provided in FIG. 6, but are presented to indicate the range of possibilities.

Figure 7A:
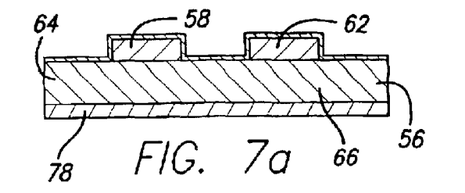
FIG. 7a, b c is a view taken on line 7a, b, c in FIG. 6.
Figure 7B:
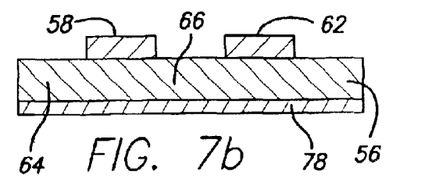
Figure 7C:
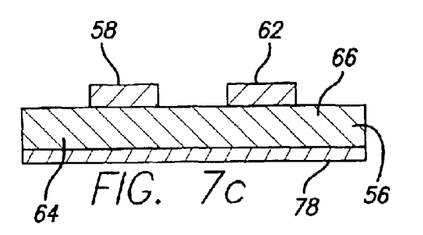
Figure 8A:
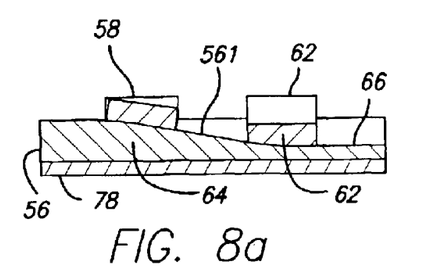
FIG. 8a, b c is a view taken on line 8a, b, c in FIG. 6.
Figure 8B:
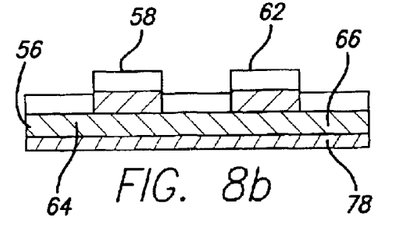
Figure 8C:
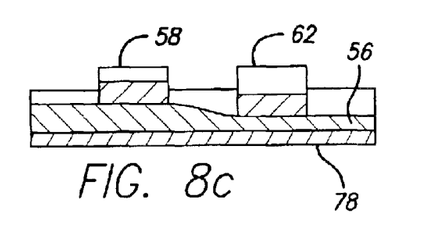
Figure 13A:
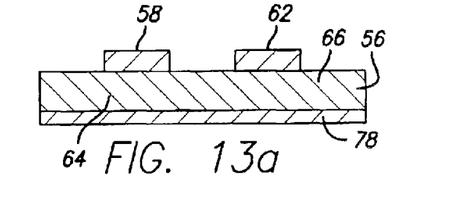
FIG. 13a, b c is a view taken on line 13a, b, c in FIG. 6.
Figure 13B:
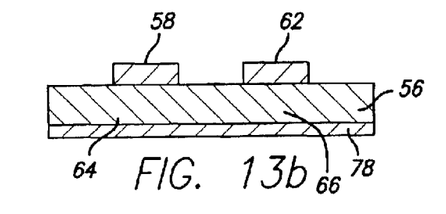
Figure 13C:
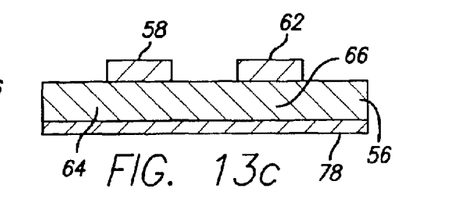
Figure 14A:
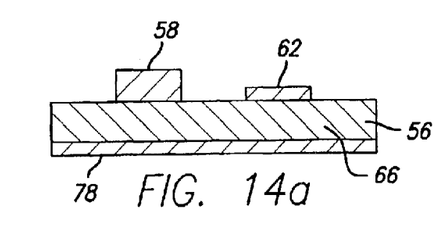
FIG. 14a, b c is a view taken on line 14a, b, c in FIG. 6.
Figure 14B:
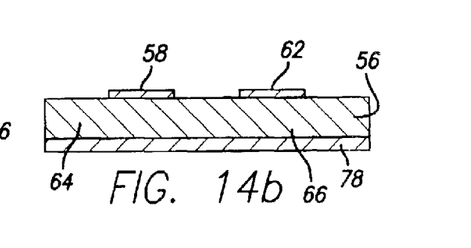
Figure 14C:
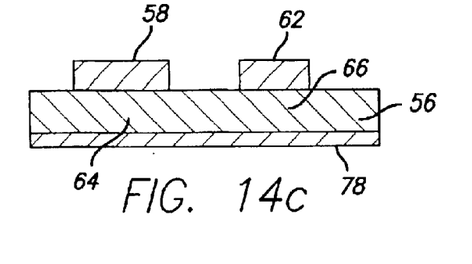

Thus in a first section (Section I) in FIG. 6, views 7a, 7b, 7c, 13a, 13b and 13c all a full thickness of insulative layer 56 and full thickness of conductors 56, 62. The next section (Section II) of FIG. 6 has views 8a, 8b, 8c, 14a, 14b and 14c in the plane of the section. FIG. 8a has laterally tapered insulative layer 56 so that conductor 62 is closer to metal layer 78, and conductor 58 is tipped slightly on the angled surface 561. The insulative layer 56 and the conductors 58, 62 are shown in elevation in the background of the view, and in other like views herein, Indicating that the changes shown in Section II from the previous Section I are local. In FIG. 8b, the insulative layer 56 has been reduced in thickness and the conductors 58, 62 correspondingly lowered toward the metal layer 78. In this view the conductors 58, 62 have a thickness of more than one-half their usual thickness. In FIG. 8c, the insulative layer 56 is oppositely tapered to have conductor 62 lowered toward the insulative layer 56. In FIGS. 13a, b and c the profile of the conductors 58, 62, insulative layer 56 and metal layer 78 remain as usual. In FIG. 7a a surface coating is shown of a charge dissipative agent such as a metal oxide, a metal or an organic composition that dissipates electrostatic charge from the interconnect surface 521.

Figure 9A:
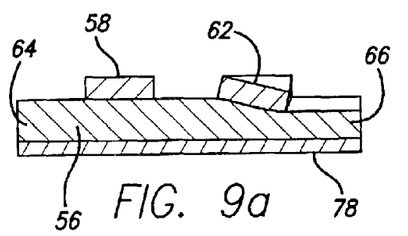
FIG. 9a, b c is a view taken on line 9a, b, c in FIG. 6.
Figure 9B:
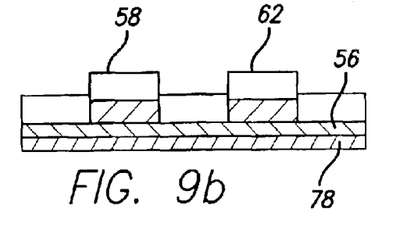
Figure 9C:
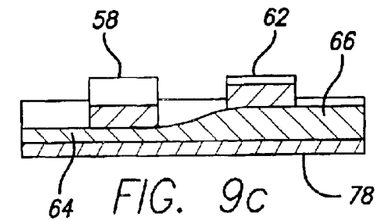
Figure 15A:
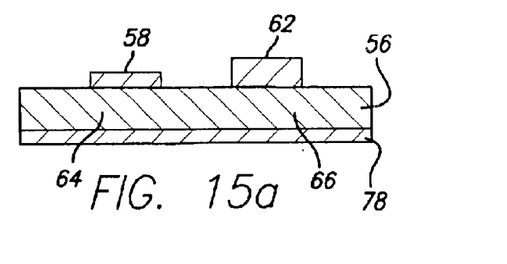
FIG. 15a, b c is a view taken on line 15a, b, c in FIG. 6.
Figure 15B:
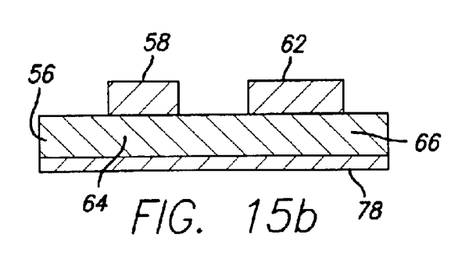
Figure 15C:
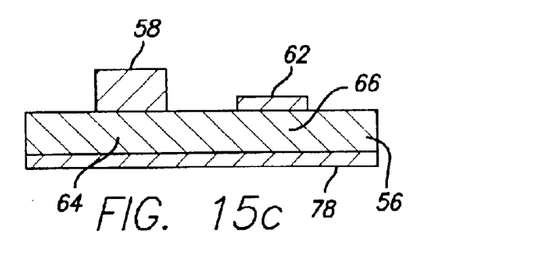

FIG. 9a, taken at Section III in FIG. 6, shows the insulative layer 56 at a standard thickness in portion 64 and sharply tapered in portion 66 to reduce the thickness of the layer under conductor 62, which is shown tipped. In FIG. 9b, the entire width of insulating layer 56 has been reduced bringing the conductors 58, 62 closer to metal layer 78. In FIG. 9c, the insulative layer portion 64 is greatly reduced in thickness so that the trace conductor 58 is closer to the metal layer 78 while insulative layer portion 66 is less reduced in thickness and conductor 62 is just slightly closer to the metal layer. In FIG. 15a, the conductor 58 is reduced in thickness while the insulative layer 56, metal layer 78 and conductor 62 are kept at their usual proportions. In FIG. 15b, the width of conductor 62 has been increased and the thickness of the conductors 58, 62 kept the same. In FIG. 15c the conductor 62 is reduced in thickness (vertical extent or height) in a reverse of FIG. 15a.

Figure 10A:
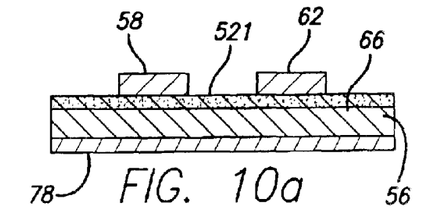
FIG. 10a, b c is a view taken on line 10a, b, c in FIG. 6.
Figure 10B:
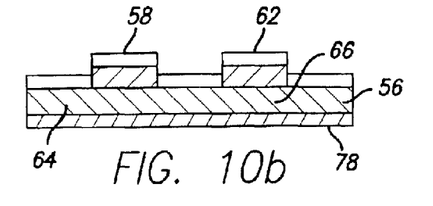
Figure 10C:
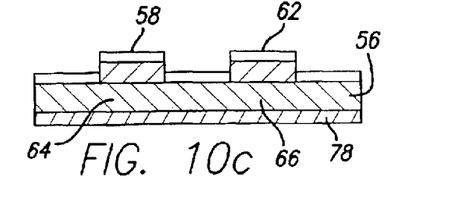
Figure 16A:
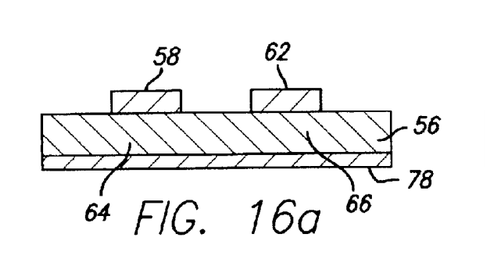
FIG. 16a, b c is a view taken on line 16a, b, c in FIG. 6.
Figure 16B:
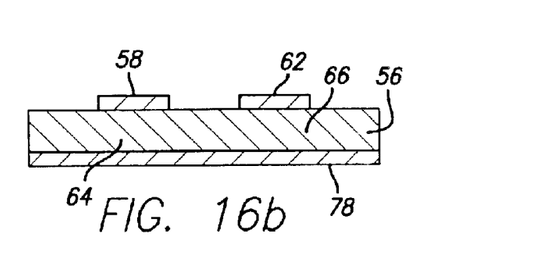
Figure 16C:
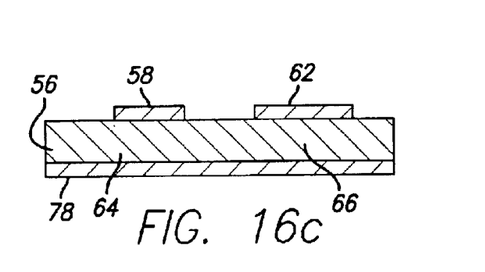

FIG. 10a, taken at Section IV in FIG. 6, shows the usual profile of the interconnect 52 with a subsurface addition of an electrostatic discharge potential dissipative agent in and under the surface 521 of the interconnect This agent which can be the metal oxides, the metals or the organic compositions noted above can be on the metal layer 78 as well as on or In the insulative plastic layer 56. FIG. 10b shows a reduction in the insulative layer 56 in both portions 64 and 66 and FIG. 10c showing a lesser reduction in the insulative layer. In FIG. 16a, the interconnect 52 has the usual profile, but in FIG. 16b the thickness of the conductors 58, 62 is reduced, and in FIG. 16c the reduced height of the conductors is retained but the width of conductor 62 is increased.

Figure 11A:
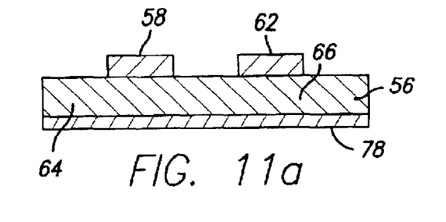
FIG. 11a, b is a view taken on line 11a, b in FIG. 6.
Figure 11B:
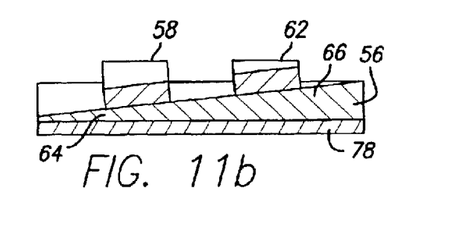
Figure 17A:
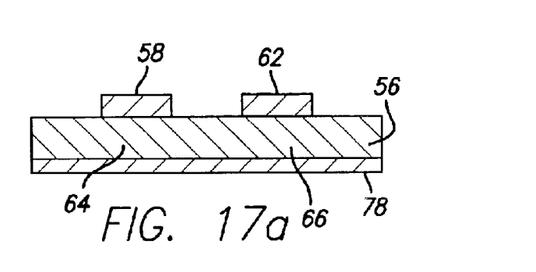
FIG. 17a, b is a view taken on line 17a, b in FIG. 6.
Figure 17B:
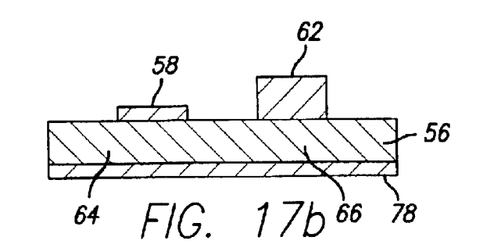

FIG. 11a, taken at Section V in FIG. 6, shows the usual profile of the interconnect 52, while in FIG. 11b the thickness of insulative layer 56 is sloped left from portion 66 to portion 64 to reduce the spacing between conductor 58 from metal layer 78 to less than the spacing between conductor 62 and the metal layer. In FIG. 17a the interconnect profile is as usual, but in FIG. 17b, the thickness of the conductor 62 has been greatly increased absolutely and with reference to conductor 58 which has been reduced in thickness to less that the usual thickness shown in FIG. 17a.

Figure 12:
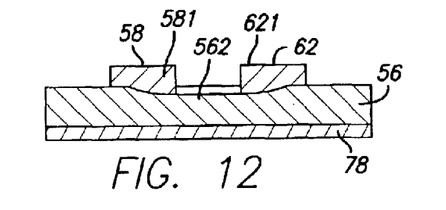
FIG. 12a is a view taken on line 12a in FIG. 6.
Figure 18:
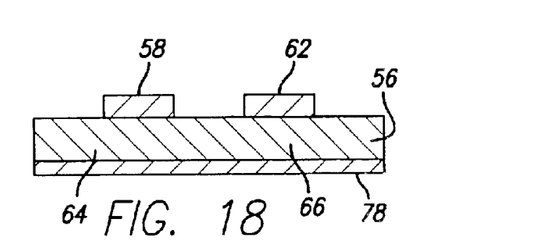
FIG. 18 is a view taken on line 18 in FIG. 6.

FIG. 12, taken at Section VI in FIG. 6, shows an insulative layer 56 dished at 562 between insulative layer portion 64 and portion 66, so that the interior parts 581, 621 of the conductors 58, 62, the conductors being contoured as shown, are less spaced from the metal layer 78 in the locally dished area 562 than outward from parts 581, 621. FIG. 18 indicates that the interconnect 52 has returned to its usual profile, but the spacing between conductors 58, 62 is increased in accordance with the invention.

In general, the insulative layer portion 64 varies in thickness relative to other local insulative layer portions, e.g. 66, laterally, distally and/or proximally adjacent thereto to vary correspondingly the proximity of the one trace conductor 58 to the metal member 78 selectively in the region 82 of the variation in thickness to vary the circuit impedance.

The series of longitudinally and laterally distributed local insulative layer portions includes in addition to portion 64 at least one other local insulative layer portion, e.g. 66 that varies in thickness longitudinally relative to local insulative layer portions laterally, distally and/or proximally adjacent thereto to vary correspondingly the proximity of the one trace conductor, e.g. conductor 58 to the metal member 78 selectively in the region of the variation in thickness in circuit impedance varying relation. The one local insulative layer portion, e.g. 64, that varies in thickness laterally also can vary in thickness longitudinally relative to local insulative layer portions, e.g. 66 laterally, distally and/or proximally adjacent thereto to vary correspondingly the proximity of the one trace conductor e.g. 58 to the metal member 78 selectively in the region of the variation in thickness in circuit impedance varying relation.

In a further embodiment, similar to the variations in the insulative layer 56 the copper or conductor layer forming conductors 58, 62 can vary in thickness and width alone or in conjunction with the insulative layer and transversely and/or longitudinally. Thus, with further reference to FIGS. 13a to 18, the invention provides an electrical interconnect 52 for a disk drive suspension 10 comprising an assembly of an insulative layer 56 and trace conductors 58, 62 forming part of a circuit, each of the trace conductors comprising a plurality of longitudinally extended local trace conductor portions 68–72 supported by the insulative layer at a given relative spacing from each other, each of the local trace conductor portions having a given width and thickness, and adapted to be supported by a metal member 78 proximately spaced from the local trace conductor portions by at least the insulative layer in impedance determining relation in the circuit, one or more of the local trace conductor portions 58, 62 being varied from their given width, given thickness and/or given relative spacing selectively in the region of the variation in width, thickness or spacing in circuit impedance correspondingly varying amount.

In a further embodiment, the invention provides a longitudinally extended flexure 16 for a disk drive suspension 10 comprising a metal member 78, the flexure comprising sets of trace conductors 58, 62 that each define a conductor circuit and first and second insulative layer portions 64, 66 attached respectively to the first and second sets of trace conductors and disposed between the set of trace conductors and the metal member, the insulative layer portions varying between themselves in thickness along the layer longitudinal and or lateral axis relative to the thickness of portions of the layer proximate thereto to vary differentially the volume of the insulative layer portions between the at least one of the sets of trace conductors and the metal member, whereby trace conductor set capacitance is varied in impedance value differentiating relation.

In its method aspects, the invention provides a method of tailoring impedance differentially throughout an electrical interconnect 52 adapted to be used in a disk drive suspension 10 having a metal layer **\*\*, the method including providing the electrical interconnect with an insulative layer 56 having multiple portions 64, 66 and relatively spaced trace conductors 58, 62 each having multiple portions and forming part of a circuit, and locally varying one or more of the thickness and width of the insulative layer portions 68–72** and the thickness, width and relative spacing of the trace conductors at longitudinally adjacent and/or laterally adjacent portions thereof to correspondingly vary capacitance in the trace conductor portions in circuit impedance varying relation selectively at the local variations.

The invention thus provides greater control of impedance values in a flexure and in a disk drive suspension incorporating the flexure, a differential In impedance between read and write circuits, and a controlled thickness in the insulative layer in the suspension flexure, e.g. differentiated between the read and write circuits, to vary the circuit capacitance and thus the impedance to optimize the impedance values for each circuit without compromise of the other circuit impedance. The foregoing objects are thus met.

We claim:

1. An electrical interconnect for a disk drive suspension comprising an assembly of an insulative layer and trace conductors forming part of a circuit, said insulative layer comprising a plurality of local insulative layer portions, each of said trace conductors comprising a plurality of local trace conductor portions supported by said local insulative layer portions at a given relative spacing from each other, each of said local trace conductor portions having a given width and thickness, each of said insulative layer portions having a given width and thickness, said interconnect being adapted to be supported by a metal member proximately space from said local trace conductor portions by at least said local insulative layer portions in impedance determining relation in said circuit, one or more of said portions being varied from one or more of their given width, given thickness and given relative spacing in circuit impedance varying amount.

2. In combination: the electrical interconnect of claim 1, and a metal member.

3. The electrical interconnect for a disk drive suspension according to claim 1, in which said interconnect has on or in or both on and in its surface where electrostatic charge is likely to build up a charge dissipative agent comprising a metal oxide, a metal or an organic composition in an electrostatic charge dissipating amount.

4. An electrical interconnect for a disk drive suspension comprising an assembly of an insulative layer and trace conductors forming part of a circuit, said insulative layer comprising a plurality of local insulative layer portions, each of said trace conductors comprising a plurality of local trace conductor portions supported by said local insulative layer portions at a given relative spacing from each other, each of said local trace conductor portions having a given width and thickness, each of said insulative layer portions having a given width and thickness, said interconnect being adapted to be supported by a metal member proximately spaced from said local trace conductor portions by at least said local insulative layer portions in impedance determining relation in said circuit, one or more of said local insulative layer portions being varied from one or more of their given width and given thickness in circuit impedance varying amount.

5. The electrical interconnect according to claim 4, in which said insulative layer extends longitudinally and includes a series of longitudinally distributed local insulative layer portions, said portions including a longitudinally extending first local insulative layer portion between said metal member and one of said trace conductors, said first local insulative layer portion being varied in thickness relative to local insulative layer portions distally and/or proximally adjacent thereto to increase or decrease the proximity of said one trace conductor to said metal member selectively in the region of said variation in thickness in circuit impedance varying relation.

6. The electrical interconnect according to claim 4, in which said insulative layer extends longitudinally and includes a series of longitudinally distributed local portions including a longitudinally extending first local insulative layer portion between said metal member and one of said trace conductors, said first local insulative layer portion being varied in width from narrower to broader relative to local insulative layer portions distally and/or proximally adjacent thereto to increase or decrease correspondingly the proximity of said one trace conductor to said metal member in circuit impedance varying relation.

7. The electrical interconnect according to claim 4, in which said insulative layer extends longitudinally and includes a series of longitudinally distributed local portions including longitudinally extending first and second local insulative layer portions between said metal member and one of said trace conductors, said first and second local insulative layer portions being independently varied in thickness, width or both relative to local insulative layer portions distally and/or proximally adjacent thereto to increase or decrease correspondingly the proximity of said one trace conductor to said metal member selectively in the regions of said variations in thickness, width or both in circuit impedance varying relation.

8. The electrical interconnect according to claim 4, in which said insulative layer extends longitudinally and laterally and includes a series of longitudinally and laterally distributed local portions including a longitudinally and laterally extending first local insulative layer portion between said metal member and one of said trace conductors, at least one of said series of local insulative layer portions being varied in thickness laterally across its width relative to local insulative layer portions laterally, distally and/or proximally adjacent thereto to vary correspondingly the proximity of said one trace conductor to said metal member selectively in the region of said variation in thickness in circuit impedance varying relation.

9. The electrical interconnect according to claim 8, in which said series of longitudinally and laterally distributed local insulative layer portions includes at least one other local insulative layer portion that varies in thickness longitudinally relative to local insulative layer portions laterally, distally and/or proximally adjacent thereto to vary correspondingly the proximity of said one trace conductor to said metal member selectively in the region of said variation in thickness in circuit impedance varying relation.

10. The electrical interconnect according to claim 8, in which said one local insulative layer portion that varies in thickness laterally also varies in thickness longitudinally relative to local insulative layer portions laterally, distally and/or proximally adjacent thereto to vary correspondingly the proximity of said one trace conductor to said metal member selectively in the region of said variation in thickness in circuit impedance varying relation.

11. In combination: the electrical interconnect of claim 4, and a metal member.

12. An electrical interconnect for a disk drive suspension comprising an assembly of an insulative layer and trace conductors forming part of a circuit, each of said trace conductors comprising a plurality of longitudinally extended local trace conductor portions supported by said insulative layer at a given relative spacing from each other, each of said local trace conductor portions having a given width and thickness, and adapted to be supported by a metal member proximately spaced from said local trace conductor portions by at least said insulative layer in impedance determining relation in said circuit, one or more of said local trace conductor portions being varied from their given width, given thickness and/or given relative spacing selectively in the region of said variation in width, thickness or spacing in circuit impedance correspondingly varying amount.

13. The electrical interconnect according to claim 12, in which each said trace conductor extends longitudinally and includes a series of longitudinally distributed local portions including a longitudinally extending first local trace conductor portion, said first local trace conductor portion being varied in thickness relative to local trace conductor portions distally, proximally or laterally adjacent thereto to increase or decrease the volume of said varied trace conductor spaced from said metal member selectively in the region of said variation in thickness in circuit impedance varying relation.

14. The electrical interconnect according to claim 12, in which each said trace conductor extends longitudinally and includes a series of longitudinally distributed local portions including a longitudinally extending fist local trace conductor portion, said first local trace conductor portion being varied in width relative to local trace conductor portions distally, proximally or laterally adjacent thereto to increase or decrease the volume of said varied trace conductor spaced from said metal member selectively in the region of said variation in width in circuit impedance varying relation.

15. The electrical interconnect according to claim 12, in which said trace conductor extends longitudinally and includes a series of longitudinally distributed local portions including longitudinally extending first and second local trace conductor portions, said first and second local trace conductor portions being independently varied in thickness, width or both relative to local trace conductor portions laterally, distally and/or proximally adjacent thereto to increase or decrease correspondingly the volume of said first and/or second local trace conductor portions spaced from said metal member selectively in the region of said variation in thickness, width or both in circuit impedance varying relation.

16. In combination: the electrical interconnect of claim 12 and a metal member.

17. The combination according to claim 16, in which said metal member comprises a load beam.

18. The combination according to claim 16, in which said metal member comprises a metal layer attached to said insulative layer.

19. A longitudinally extended flexure for a disk drive suspension comprising a metal member, said flexure comprising sets of trace conductors that each define a conductor circuit and first and second insulative layer portions attached respectively to said sets of trace conductors and disposed between said sets of trade conductors and said metal member, said insulative layer portions varying between themselves in thickness along the layer longitudinal and or lateral axis relative to the thickness of portions of said layer proximate thereto to vary differentially the volume of said insulative layer portions between at least one trace conductor in said set of trace conductors and said metal member, whereby trace conductor set capacitance is varied in impedance value differentiating relation.

20. The longitudinally extended flexure according to claim 19, in which said trace conductors also vary in thickness and/or width along their longitudinal axis in conductor circuit impedance varying relation.

21. The longitudinally extended flexure according to claim 19, in which said suspension includes a bad beam, said load beam defining said suspension metal member.

22. A longitudinally extended flexure for a disk drive suspension comprising a metal member, said flexure comprising first and second sets of trace conductors that each define a conductor circuit and first and second insulative plastic layers attached respectively to said first and second sets of trace conductors and disposed between said set of trace conductors and said metal member, said first plastic layer locally varying in thickness along its longitudinal axis to vary correspondingly the volume of said first plastic layer between said first set of trace conductors and said metal member, whereby trace conductor first set capacitance is varied in conductor circuit impedance varying relation.

23. The flexure according to claim 22, in which one or more of said trace conductors vary in thickness along their longitudinal axis in conductor circuit impedance varying relation.

24. The flexure according to claim 23, in which said second plastic layer also varies in thickness along its longitudinal axis in trace conductor second set capacitance varying relation.

25. The flexure according to claim 22, in which said first plastic layer also varies in thickness in a direction transverse to its said longitudinal axis.

26. The flexure according to claim 25, in which one or more said trace conductors vary in thickness along their longitudinal axis in conductor circuit impedance varying relation.

27. The flexure according to claim 25, in which said second plastic layer also varies in thickness in a direction transverse to its said longitudinal axis.

28. In combination: the flexure of claim 22 and a disk drive suspension metal member.

29. The combination according to claim 28, in which said metal member comprises a load beam.

30. The combination according to claim 28, in which said metal member comprises a metal layer attached to said plastic layer.

31. A longitudinally extended flexure for a disk drive suspension comprising a metal member, said flexure comprising first and second sets of trace conductors that each define a conductor circuit, a metal layer, and first and second insulative plastic layers between said first and second sets of trace conductors and said metal layer, said first plastic layer locally varying in thickness along its longitudinal axis to vary correspondingly the volume of said first plastic layer between said first set of trace conductors and said metal member, whereby trace conductor first set capacitance is varied relative to said second set of trace conductors and in first set trace conductor circuit impedance varying relation.

32. A longitudinally extended flexure for a disk drive suspension comprising a metal member, said flexure comprising first and second sets of trace conductors that each define a conductor circuit and first and second insulative plastic layers attached respectively to said first and second sets of trace conductors and disposed between said set of trace conductors and said metal member, said first and second plastic layers independently locally varying in thickness along their respective longitudinal axes to vary correspondingly the volume of said first and second plastic layers respectively between said first set of trace conductors and said metal member, whereby the capacitance of said trace conductor first and second sets is independently locally varied in conductor circuit impedance varying relation.

33. In combination: the flexure of claim 32 and a disk drive suspension metal member.

34. The combination according to claim 33, in which said metal member comprises a load beam.

35. The combination according to claim 33, in which said metal member comprises a metal layer attached to said plastic layer.

36. A longitudinally extended electrical interconnect for a disk drive suspension, said interconnect comprising first and second sets of trace conductors that each define a conductor circuit and first and second insulative plastic layers attached respectively to said first and second sets of trace conductors to be disposed between said sets of trace conductors and a metal member, said first plastic layer varying in thickness along its longitudinal axis relative to the thickness of said second plastic layer to vary differentially the volume of said first plastic layer to be between said first set of trace conductors and said metal member relative to the volume of said second plastic layer to be between said second set of trace conductors and said metal member, whereby trace conductor first and second trace conductor set capacitance is varied in impedance differentiating relation.

37. The interconnect according to claim 36, in which at least one of said trace conductors varies in thickness along its longitudinal axis in conductor circuit impedance varying relation.

38. The interconnect according to claim 37, in which each said first and/or second plastic layer varies locally in thickness along its respective longitudinal axis in trace conductor first and second set respective capacitance varying relation.

39. The interconnect according to claim 36, in which said first plastic layer also varies in thickness in a direction transverse to its said longitudinal axis.

40. The interconnect according to claim 39, in which at least one of said trace conductors varies in thickness along its longitudinal axis in conductor circuit impedance varying relation.

41. The interconnect according to claim 36, in which said first and second plastic layers vary in thickness in a direction transverse to their said longitudinal axes.

42. A longitudinally extended electrical interconnect for a disk drive suspension comprising a metal member, first and second sets of trace conductors that each define a conductor circuit, and first and second insulative plastic layers between said metal layer and said first and second sets of trace conductors, said first plastic layer locally varying in thickness along its longitudinal axis to vary correspondingly the volume of said first plastic layer between said first set of trace conductors and said metal layer, whereby trace conductor first set capacitance is varied relative to said second set of trace conductors and in first set trace conductor circuit impedance varying relation.

43. The interconnect according to claim 42, in which at least one of said trace conductors varies in thickness along its longitudinal axis in conductor circuit impedance varying relation.

44. The interconnect according to claim 42, in which both said first and second plastic layers vary in thickness along their respective longitudinal axes in trace conductor first set and second set capacitance varying relation.

45. The interconnect according to claim 42, in which said first and/or second plastic layers vary in thickness along their respective longitudinal axes and vary in thickness transversely to said longitudinal axes in conductor circuit first and/or second set capacitance varying relation.

46. In combination: the interconnect of claim 42 and a disk drive suspension metal member.

47. A longitudinally extended flexure for a disk drive suspension comprising a metal member, said flexure having longitudinally varying impedance values in conductor circuits, said flexure comprising first and second sets of trace conductors that each define a conductor circuit and first and second insulative plastic layers attached respectively to said first and second sets of trace conductors and disposed between said set of trace conductors and said metal member, said first plastic layer having locally a thickness along its longitudinal axis different from the thickness of said second plastic layer to vary differentially the volume of said first plastic layer between said first set of trace conductors and said metal member and the volume of said second plastic layer between said second set of trace conductors and said metal member, whereby trace conductor first set capacitance is varied relative to trace conductor second set capacitance in impedance differentiating relation between said first and second trace conductor sets.

48. The longitudinally extended flexure according to claim 47, in which said suspension includes a load beam, said load beam defining said suspension metal layer.

49. The longitudinally extended flexure according to claim 47, in which said flexure comprises said trace conductors, said insulative plastic layers and a metal layer, said metal layer defining said suspension metal member.

50. A longitudinally extended flexure for a disk drive suspension, said flexure having longitudinally varying impedance values in conductor circuits, said flexure comprising first and second sets of trace conductors that each define a conductor circuit and first and second insulative plastic layers attached respectively to said first and second sets of trace conductors to be disposed between said set of trace conductors and a metal member, said first and/or second plastic layers locally varying in thickness along their respective longitudinal axes to have a differential thickness ranging from a locally lesser thickness in a first plastic layer to a locally greater thickness in a second plastic layer, said first set of trace conductors having said plastic layer of said locally lesser thickness and defining a read circuit and having a said plastic layer providing a spacing to be relatively closer to said metal member across said plastic layer and the other of said sets of trace conductors having a said plastic layer of locally greater thickness defining a write circuit and providing a spacing to be relatively farther from said metal member across said plastic, layer, whereby there is a capacitance differential between the read and write circuits, the capacitance differential providing the selected and different impedances for the circuits.

51. The disk drive suspension flexure according to claim 50, in which said selected impedance for said write circuit is greater than the selected impedance for said read circuit.

52. The disk drive according to claim 51, in which said selected write circuit impedance ranges from 80 to 110 ohms.

53. The disk drive according to claim 51, in which said read circuit impedance ranges from 80 to 80 ohms.

54. The disk drive according to claim 51, in which said first plastic layer lesser thickness is not less than 0.00030 inch, and said second plastic layer greater thickness is not less than 0.00050 inch, said first and second plastic layers differing in thickness by at least 0.00020 inch.

55. A disk drive suspension having selected and different impedance values for its read trace conductor circuit and its write trace conductor circuit, said suspension comprising a steel load beam having a rigid section and extended along the length of said load beam rigid section a flexure for supporting a slider at the distal end of said load beam for operative association with a disk, said flexure comprising an assembly with said load beam of plural sets of trace conductors and an insulative plastic layer that spaces said trace conductors from said load beam in capacitance determining relation, said plastic layer having along the load beam longitudinal axis locally a differential thickness ranging from a lesser thickness in a first longitudinal portion to a greater thickness in a second longitudinal portion, said plural sets of trace conductors including a first set of trace conductors defining a read circuit and attached to said plastic layer at a spacing to be locally relatively closer to said load beam across said plastic layer and a second set of trace conductors defining a write circuit and attached to said plastic layer at a spacing to be locally relatively farther from said load beam across said plastic layer, whereby there is a capacitance differential between said read and write circuits, said capacitance differential providing said selected and different impedances for said circuits.

56. The disk drive suspension according to claim 55, in which said first and/or second set plastic layers define a differential thickness in first and second lateral portions.

57. The disk drive suspension according to claim 55, in which said flexure further comprises a metal layer bonded to said plastic layer.

58. The disk drive suspension according to claim 55, in which said plastic layer comprises polyimide resin.

59. The disk drive suspension according to claim 55, in which the stiffness of the disk drive suspension is reduced less than about 10% as a result of the difference in thickness between the plastic layer first and second lateral portions.

60. The disk drive suspension according to claim 58, in which said plastic layer first lateral portion has a thickness of not less than 0.00030 inch, and said plastic layer second lateral portion has a thickness of not less than 0.00050 inch, said plastic layer first and second lateral portions differing in thickness by at least 0.00020 inch.

61. A method of making a disk drive suspension comprising a steel member and a flexure having selected and different impedance value for its read trace conductor circuit and its write trace conductor circuit, said circuits comprising trace conductors attached to a plastic layer disposed between said trace conductors and said metal member, said method including maintaining a thickness differential between longitudinally successive portions of said plastic layer in one or both of said circuits in capacitance controlling relation, whereby there is a capacitance differential along the length of said read and/or write circuits, said capacitance differential providing selected and different impedances for said circuits.

62. The method according to claim 61, including also maintaining a thickness differential between laterally adjacent portions of said plastic layer in one or both of said circuits in capacitance controlling relation, whereby there is a capacitance difference along the width of said read and/or write circuits, said capacitance difference providing selected and different impedances for said circuits.

63. The method according to claim 61, including also maintaining a thickness differential between longitudinally successive portions of said trace conductors in one or both of said circuits in capacitance controlling relation, whereby there is a capacitance difference along the length of said read and/or write circuits, said capacitance difference providing selected and different impedances for said circuits.

64. The method according to claim 62, including also maintaining a width differential between longitudinally successive portions of said trace conductors in one or both of said circuits in capacitance controlling relation, whereby there is a capacitance difference along the length of said read and/or writ circuits, said capacitance difference providing selected and different impedances for said circuits.

65. A method of controlling impedances in a disk drive suspension comprising a metal member and an electrical interconnect supported by said metal member and comprising first and second circuits having trace conductors attached to a plastic layer disposed between said trace conductors and said metal member, said method including locally varying one or more of the longitudinal thickness of said plastic layers, the lateral thickness of said plastic layers, and the longitudinal thickness of said trace conductors in said first and for second circuits to correspondingly control capacitance in said trace conductors and impedance in said circuits.

66. The method according to claim 65, including also providing said disk drive suspension with a load beam, said load beam defining sold metal member.

67. The method according to claim 66, including also providing a metal layer on said electrical interconnect opposed to said load beam.

68. The method according to claim 65, including also providing a metal layer on said interconnect, said metal layer defining said metal member.

69. A method of tailoring impedance differentially throughout an electrical interconnect adapted to be used in a disk drive suspension having a metal layer, including providing said electrical interconnect with an insulative layer having multiple portions and relatively spaced trace conductors each having multiple portions and forming part of a circuit, and locally varying one or more of the thickness and width of said insulative layer portions and the thickness, width and relative spacing of said trace conductors at longitudinally adjacent and/or laterally adjacent portions thereof to corresponding vary capacitance in said trace conductor portions in circuit impedance varying relation selectively at said local variations.

* * * * *